United States Patent [19]

Sugai et al.

[11] Patent Number: 4,761,814
[45] Date of Patent: Aug. 2, 1988

[54] VARIABLE BANDWIDTH MULTIVOICE DEMODULATING CIRCUIT

[75] Inventors: Yoshiro Sugai; Hiroyuki Kimura, both of Saitama, Japan

[73] Assignee: Pioneer Electronic Corporation, Tokyo, Japan

[21] Appl. No.: 876,601

[22] Filed: Jun. 20, 1986

[30] Foreign Application Priority Data

Jun. 20, 1985 [JP] Japan ............................ 60-92160[U]

[51] Int. Cl.⁴ ............................................ H04H 5/00
[52] U.S. Cl. .................................... 381/13; 358/144; 381/98
[58] Field of Search .................. 381/2, 3, 13, 98, 101, 381/4, 12; 358/144

[56] References Cited

U.S. PATENT DOCUMENTS

| | | | |
|---|---|---|---|
| 3,980,832 | 9/1976 | Nakamura et al. | 381/21 |
| 3,991,374 | 11/1976 | Csicsatica et al. | 381/11 |
| 4,032,717 | 6/1977 | Mallon | 381/11 |
| 4,208,547 | 6/1980 | Simeau | 381/13 |
| 4,356,510 | 10/1982 | Nakayama | 358/144 |
| 4,379,207 | 4/1983 | Kubota | 381/13 |
| 4,602,380 | 7/1986 | Stebbing | 381/13 |

Primary Examiner—Forester W. Isen
Attorney, Agent, or Firm—Sughrue, Mion, Zinn, Macpeak, and Seas

[57] ABSTRACT

A multivoice demodulator circuit in which a sub-signal is separated from the main signal. The sub-signal may have different content and characteristic dependent upon the reception mode of the original signal. The sub-signal is given different frequency characteristics dependent upon the reception mode.

8 Claims, 2 Drawing Sheets

VARIABLE BANDWIDTH MULTIVOICE DEMODULATING CIRCUIT

BACKGROUND OF THE INVENTION

This invention relates to a multivoice demodulating circuit for a TV multivoice receiver for receiving a TV multivoice broadcast, the receiver being intended for mobile use.

FIG. 3 shows a conventional circuit of the sort described above.

The conventional circuit shown in FIG. 3 comprises an input terminal 1 for receiving a composite signal obtained through FM detection by an audio detector (not shown). A low-pass filter (LPF) 2 allows a main signal (L+R) or main audio signal in the composite signal to pass therethrough. A band-pass filter (BPF) 3 allows carriers in the composite signal at 2 $f_H$ ($f_H$=15.75 kHz) and at 3.5 $f_H$ to pass therethrough. A sub-signal demodulating circuit 4 receives the 2 $f_H$ carrier drawn from the band-pass filter 3 and provides a subsignal (L−R) or subaudio signal as its output. A Q signal indentifying circuit 5 receives the 3.5 $f_H$ carrier from the band-pass filter 3. The Q signal is a signal superimposed on the composite signal which identifies the mode of the broadcast, e.g., monaural, stereo or multi-lingual. A mode setting circuit 6 generates a mode switching signal derived from the signal generated by the Q signal identifying circuit 5 and a mode setting signal. A matrix circuit 7 controlled by the mode switching signal received from the mode setting circuit 6 is used to process the main signal or main audio signal L+R drawn from the lowpass filter 2 and the sub-signal or subaudio signal L−R from the sub-signal demodulating circuit 4 so as to produce the audio signals L and R distributed to left and right channels through de-emphasis circuits 8 and 8'. The form of the outputs L and R depends upon which mode has been set. In the case of multi broadcasts, the user specifies by the mode setting signal which voice signal is to be heard.

In the circuit thus arranged, the mode setting circuit 6 draws a 922.5 Hz (multi) or 982.5 Hz (stereo) control signal by AM-detecting the 3.5 $f_H$ carrier drawn from band-pass filter 3 and controls the matrix circuit 7 using the mode setting signal and the identifying signal from the Q signal identifying circuit 5 for distinguishing between the stereo and multi modes based on the control signal.

However, the sub-audio signal or the sub-signal is strongly affected by various types of noise to an extent greater than that to which the main signal or main audio signal is affected. The sub-signal only may be generated particularly in the multi mode and is thus disadvantageous against noise compared with the case of the stereo mode wherein the main signal and the sub-signal are generated in the form of a composite signal.

Attempts may be made to reduce the influence of noise by limiting the band. In that case, almost no problem is posed while conversation is broadcast but the tone sensitivity is extremely impaired when music is being broadcast.

When an auto separation control is simultaneously employed, moreover, the sub-audio signal or the sub-signal is strongly affected by noise because the attenuation of the sub-signal must be suppressed because of a feeling of physical disorientation.

SUMMARY OF THE INVENTION

The present invention is intended to eliminate the above drawbacks in the prior art and it is therefore an object of the invention to provide a multivoice demodulating circuit capable of reducing noise simply and less costly without causing listeners to sense too much tone quality deterioration.

In the multivoice demodulating circuit according to the present invention, noise can be reduced without causing listeners to sense too much tone quality deterioration because frequency characteristics are shifted by a frequency characteristic switch in response to a reception mode set by reception mode setting means.

DETAILED DESCRIPTION OF THE PREFERRED EMBODIMENTS

Referring now to the accompanying drawings, embodiments of the present invention will be described.

Figure 1:
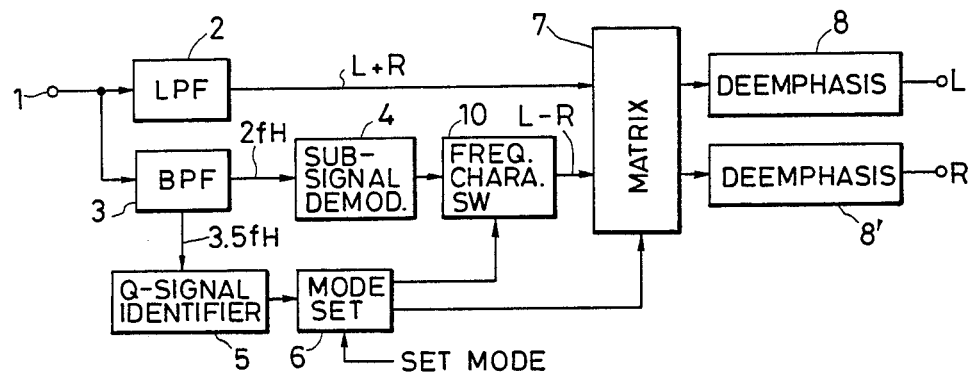
FIG. 1 is a block diagram of a multivoice demodulating circuit embodying the present invention.
Figure 3:
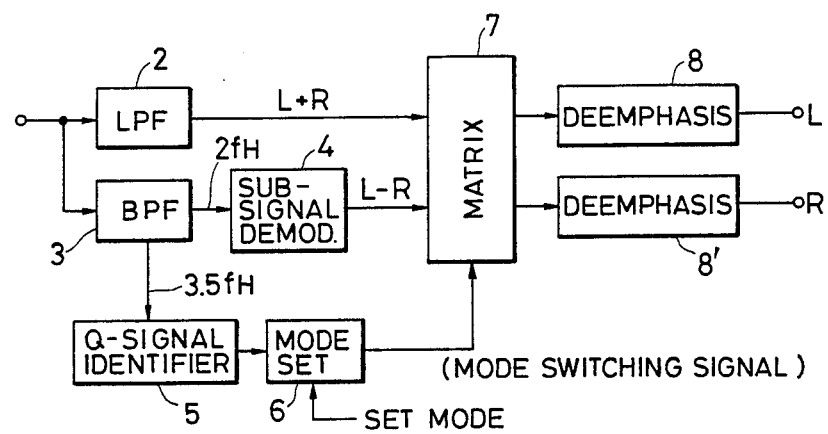
FIG. 3 is a block diagram of a conventional multivoice demodulating circuit.

FIG. 1 is a block diagram of a multivoice demodulating circuit embodying the present invention, wherein corresponding reference numbers designate similar elements in FIG. 3 and their description will be omitted.

In FIG. 1, a frequency characteristic switching circuit 10 is arranged between the sub-signal demodulating circuit 4 and the matrix circuit 7 and the frequency characteristics of the circuit are shifted in response to the signal received from the mode setting circuit 6.

Figure 4:
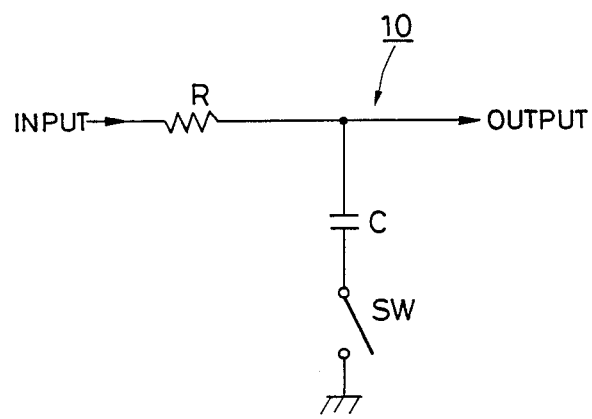
FIG. 4 is a frequency characteristic switching circuit embodying the present invention.

FIG. 4 is a frequency characteristic switching circuit embodying the present invention. In FIG. 4, a switch SW is closed in the multi mode.

In other words, the contents of the modulated broadcast wave are mainly represented in the stereo mode by music and in the multi mode by conversation contained in news and movies, e.g. As it is very rare that the broadcasts have such contents to the contrary in either mode, the frequency characteristic switching circuit 10 is controlled so as not to limit the band-width too much in the stereo mode because the influence of noise is relatively weak but importance is attached to tone quality. On the other hand, the sub-signal band is limited in the multi mode. In the multi-mode sub-signal band the signal is subjected to the influence of noise but importance is attached to the contents of data rather than to tone quality. Thus the contents of the broadcast which concentrates on conversation is not so much spoiled by the band-width limitation. Thus the frequency characteristics switching circuit 10 operates as a switchable band-pass filter.

The above frequency characteristics switching circuit 10 may be allowed to only attenuate all frequencies above a given cutoff frequency against noise but may preferably be caused to attenuate those below a given cutoff frequency properly in concert therewith to minimize a feeling of physical disorientation. Moreover, the sound volume may be increased depending on the band limitation because the sound volume sensitivity is impaired to the extent of the band limitation.

Figure 2:
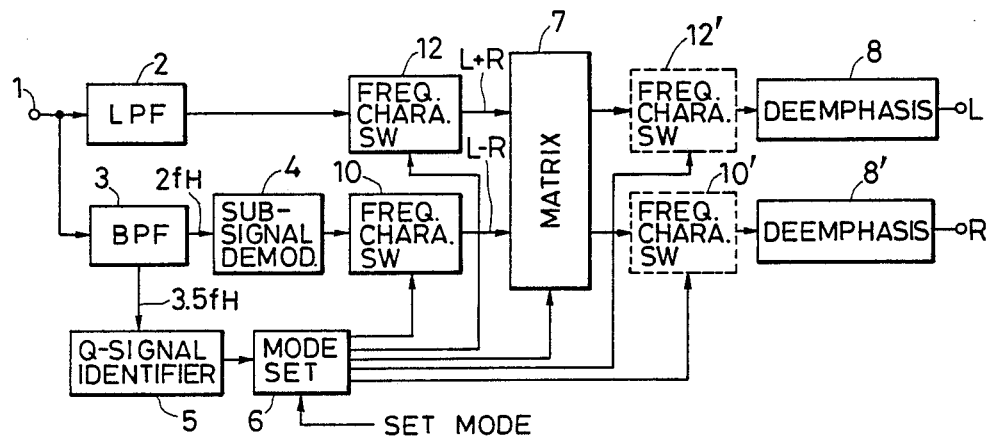
FIG. 2 is a block diagram of another multivoice demodulating circuit embodying the present invention.

Although the frequency characteristics of the sub-signal only are shifted in the above embodiment, another frequency characteristic switching circuit 12 should preferably be inserted between the low pass filter 2 for the main signal and the matrix circuit 7, as shown in FIG. 2, in order to simultaneously impose a proper band-width limitation on the main signal to reduce a feeling of physical disorientation when the sub-signal is switched to the main signal.

Moreover, the frequency characteristic switching circuits 10 and 12 may be moved to a stage following the matrix circuit 7 as circuits 10' and 12' shown by a dotted line of FIG. 2. Also the de-emphasis circuits 8 and 8' may be arranged in the stage preceding the matrix circuit 7.

When an auto separation control is simultaneously used, the attenuation of the sub-signal is made small in quantity because noise has been reduced by the band-width limitation in the multi mode, so that a feeling of physical disorientation is suppressed.

Other circuits may be used simultaneously as frequency characteristic switching circuits by shifting the cutoff frequency of LPF 2 and the time constants of the de-emphasis circuits 8 and 8'.

As set forth above, the frequency characteristics are shifted in accordance with the reception mode and the band can be limited only in the mode easily affected by noise. Thereby reduction in noise can be attempted without causing listeners to sense too much tone quality deterioration.

The frequency characteristics are so shifted that, in the stereo mode wherein music is often broadcast and wherein the influence of noise is relatively weak, the band may be set wider, whereas the band may be set narrow in the multi mode wherein conversation is often broadcast and wherein the influence of noise is strong. The above effects are accordingly achieved at less cost because the number of additional parts for the purpose is quite small.

What is claimed is:

1. A multivoice demodulator circuit, said circuit comprising:
   means for setting a reception mode based on a mode identified by a multivoice mode signal superimposed on a received signal;
   means for extracting first and second audio signals from said received signal and for separating said first signal from said second signal; and
   audio frequency characteristic switching means for shifting only audio frequency characteristics of said second extracted signal in response to whether said set reception mode is a multi mode or stereo mode.

2. A multivoice demodulator circuit as recited in claim 1, wherein said switching means sets a narrower frequency pass band when said setting means is set to said multi mode than when it is set to said stereo mode.

3. A multivoice demodulating circuit as recited in claim 1, wherein said first signal is a main signal and said second signal is a subsignal.

4. A multivoice demodulator circuit as recited in claim 3, wherein said switching means additionally adjusts the volume of said subsignal in accordance with the output of said setting means.

5. A multivoice demodulating circuit as recited in claim 3, wherein said shifting means additionally shifts frequency characteristics of said main signal in response to the reception mode set by said setting means.

6. A multivoice demodulator as recited in claim 3, wherein said setting means is responsive to a signal in said received signal.

7. A multivoice demodulating circuit as recited in claim 3, wherein said extracting means demodulates said subsignal prior to said frequency characteristic switching means.

8. A multivoice demodulator circuit, comprising:
   a low pass filter receiving a received signal and providing a main signal;
   a band-pass filter receiving said received signal and providing a first signal at a first carrier frequency and a second signal at a second carrier frequency;
   a demodulator receiving said first signal and providing a sub-signal;
   mode setting means receiving said second signal and setting a reception mode of said received signal;
   a switchable circuit having an audio frequency characteristic switchable between at least two predetermined characteristics, said switchable circuit being switched in response to said reception mode set by said mode setting means, said switchable circuit receiving said sub-signal and providing a switched sub-signal; and
   a matrix circuit receiving said main signal and said switched sub-signal and combining and separating them to provide two output signals, said combining and separating depending upon said reception mode set by said mode setting means.

* * * * *